Patented Feb. 16, 1932

1,845,452

UNITED STATES PATENT OFFICE

FRITZ TELLER, OF LUDWIGSHAFEN-ON-THE-RHINE, GERMANY, ASSIGNOR TO GENERAL ANILINE WORKS, INC., OF NEW YORK, N. Y., A CORPORATION OF DELAWARE

PRODUCTION OF PRINTING PASTES AND PRINTS THEREFROM

No Drawing. Application filed March 5, 1930, Serial No. 433,506, and in Germany March 19, 1929.

The present invention relates to the production of printing pastes and prints therefrom.

In the production of prints on cloth or the like with organic dyestuffs which require alkali for fixing them on the fibres, in particular with vat dye-stuffs, printing pastes are generally speaking employed which contain alkali and reducing agents in addition to the usual thickening agent such as starch, dextrin, vegetable mucilages or water-soluble gums and the like. The prints thus prepared must be steamed shortly after their preparation in order to fix the dyestuff on the fibres since when kept for a long time the destruction of the reducing agent in the air takes place and the beauty and fastness of the prints suffer in consequence. In cases therefore in which a long storage of the prints before fixing cannot be avoided the process is carried out for example by hand or spray printing with vat dyestuffs and sulphur dyestuffs in such a manner that the printing colors are prepared in the absence of alkalies and reducing agents, the prints being subsequently fixed on the threads with a bath containing alkali and a reducing agent, with or without steaming. This method has the objection that the printed colors are caused to run more or less by the subsequent wet treatment. When working in this manner it is therefore necessary to employ cellulose ethers and certain mucilages which possess the property of coagulating with sufficiently strong alkali so that in the treatment in the alkaline bath, running or straining of the prints is prevented.

I have now found that cloth prints can be produced in a very advantageous manner with organic dyestuffs which require alkali to fix them on the fibres by adding solid polymerized vinyl alcohol, as such or in the form of an aqueous solution thereof, as the thickening agent and, if desired, also adding other thickening agents but no alkali, to the printing color to be employed, the prints being subsequently treated with a bath containing alkali and if necessary a reducing agent. For example the viscous aqueous solutions of solid polymerized vinyl alcohol, which for the sake of brevity will be referred to in the following and in the claims as poly-vinyl alcohol, may be employed alone or in admixture with other usual thickening agents. The coagulative power of the solutions of poly-vinyl alcohol is so great that a comparatively small addition thereof to a customary wheat starch thickening for example is sufficient to obtain entirely sharply defined prints by the treatment in an alkaline developing bath. In particular the covering power of the printing colors and therefore the strength of color of the prints may be considerably increased by addition of starch.

The pastes according to the present invention must be free of course from alkali since otherwise a disagreeable coagulation of the poly-vinyl alcohol in the pastes would occur and consequently the reducing agent which may be incorporated with the pastes must not show alkaline reaction, formaldehyde sulfoxylate, however, for example coming into consideration, or glucose which latter exerts its reducing power when coming into contact with alkali in the developing bath. The quantity of poly-vinyl alcohol in the pastes may be varied as desired from about 0.5 to 30 per cent by weight of the pastes. In any case the prints obtained with the aid of printing pastes containing poly-vinyl alcohol as the thickening agent, or as one of the thickening agents are much purer and show much stronger shades than those prepared without the said agent. Besides this good prints may now be obtained even from dyestuffs which hitherto furnished rather bad prints.

The following examples will further illustrate the nature of this invention but the invention is not restricted to these examples. The parts are by weight.

Example 1

400 parts of water are added to 100 parts of poly-vinyl alcohol, the whole is stirred on the water bath for from ½ to ¾ths of an hour until complete solution has taken place, diluted to 500 parts with water and stirred until cold.

Prints are then produced in the usual manner with a printing color consisting of 50 grams of indanthrene blue GCD double paste fine (Schultz, Farbstofftabellen, 1923, page 289, No. 842) and 950 grams of the thickening agent prepared as hereinbefore described; the prints are dried and then slop-padded with a bath containing 85 grams of calcined soda, 110 grams of formaldehyde sodium sulphoxylate and 75 grams of glycerol. After drying the prints are steamed and made ready in the usual manner. The dyestuff referred to above may be replaced by indanthrene gold orange R (Schultz, Farbstofftabellen, 1923, No. 761), indanthrene green B (Schultz, Farbstofftabellen, 1923, No. 765) or algol scarlet G (Schultz, Farbstofftabellen, 1923, No. 815).

*Example 2*

250 parts of the solution of poly-vinyl alcohol described in the first paragraph of Example 1 are mixed with 750 parts of a 10 per cent wheat starch paste.

Prints prepared by the process described in the foregoing example are dried after slop-padding with the developing bath and are then fixed by passage through a caustic soda solution of 20° Baumé strength heated to about 90° centigrade, washed, acidified and made ready in the usual manner.

*Example 3*

70 parts of wheat starch are well mixed with 18 parts of poly-vinyl alcohol, boiled on the water bath with 1,000 parts of water for from ½ to ¾ths of an hour, diluted to 1,000 parts with water and then stirred until cold.

The prints prepared according to Example 1 with this thickening agent can be fixed by one of the methods described in the foregoing examples and then finished off.

What I claim is:—

1. Printing pastes free from alkali comprising an organic dyestuff, ordinarily requiring alkali for its fixation on fibres, and poly-vinyl alcohol.

2. Printing pastes free from alkali comprising an organic dyestuff, ordinarily requiring alkali for its fixation on fibres, poly-vinyl alcohol, and another thickening agent.

3. Printing pastes free from alkali comprising an organic dyestuff ordinarily requiring alkali for its fixation on fibres, poly-vinyl alcohol, another thickening agent and a non-alkaline reducing agent.

4. Printing pastes free from alkali comprising a vat dyestuff and poly-vinyl alcohol.

5. Printing pastes free from alkali comprising a vat dyesuff, poly-vinyl alcohol and another thickening agent.

6. Printing pastes free from alkali comprising a vat dyestuff and from about 0.5 to 30 per cent by weight of the paste of poly-vinyl alcohol.

7. Printing pastes free from alkali comprising a vat dyestuff, from 0.5 to 30 per cent its weight of poly-vinyl alcohol and another thickening agent.

In testimony whereof I have hereunto set my hand.

FRITZ TELLER.